United States Patent
Aoki et al.

(10) Patent No.: US 7,379,260 B2
(45) Date of Patent: May 27, 2008

(54) CONTROL APPARATUS, STORAGE DEVICE, AND HEAD RETRACTING METHOD

(75) Inventors: Takahiro Aoki, Kawasaki (JP); Takeshi Hara, Kawasaki (JP); Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 66 days.

(21) Appl. No.: 11/581,307

(22) Filed: Oct. 16, 2006

(65) Prior Publication Data
US 2007/0285823 A1 Dec. 13, 2007

(30) Foreign Application Priority Data
Jun. 9, 2006 (JP) .............................. 2006-161021

(51) Int. Cl.
G11B 21/02 (2006.01)
(52) U.S. Cl. .......................................... 360/75; 360/69
(58) Field of Classification Search .................... None
See application file for complete search history.

(56) References Cited
U.S. PATENT DOCUMENTS
6,771,449 B1  8/2004  Ito et al.
6,995,939 B2  2/2006  Ito et al.
2005/0270700 A1  12/2005  Matsumoto
2007/0086108 A1*  4/2007  Kuroki et al. ................ 360/75

FOREIGN PATENT DOCUMENTS
| JP | 2002-8336 | 1/2002 |
|---|---|---|
| JP | 2002-174641 | 6/2002 |
| JP | 2003-263240 | 9/2003 |
| JP | 2004-355775 | 12/2004 |
| JP | 2005-302557 | 10/2005 |
| JP | 2005-346840 | 12/2005 |

* cited by examiner

Primary Examiner—Andrew L. Sniezek
(74) Attorney, Agent, or Firm—Greer, Burns & Crain, Ltd.

(57) ABSTRACT

A sample-information extracting unit acquires a fall signal indicating whether a storage device is falling, conducts a sampling in response to the fall signal, and sequentially extracts sample information including either one of first information indicating a falling state and second information indicating a non-falling state. A retraction determining unit determines whether to retract the head, based on features of an array of the extracted sample information.

20 Claims, 5 Drawing Sheets

CONTROL APPARATUS, STORAGE DEVICE, AND HEAD RETRACTING METHOD

BACKGROUND OF THE INVENTION

1. Field of the Invention

The present invention relates to a technology for retracting a head on a storage medium by detecting a fall of a storage device, with a capability of precisely conducting a head retraction.

2. Description of the Related Art

A magnetic disk drive is mainly used as an auxiliary storage device of a general-purpose computer and for a business-purpose device that requires high-capacity random access data recording. Furthermore, use of the magnetic disk drive as a general household appliance has increased recently, with an advance of digitalization of household appliances and an increase of applications to record data such as audio-visual data as digital data (for example, a hard disk video recorder and a portable music reproducing device).

However, when the magnetic disk drive receives a strong impact due to a fall, a head collides with a disk surface and the disk surface gets scratched, and data reading and writing may become impossible. Particularly, falls of the magnetic disk drive while it is in operation cause the magnetic disk drive to become easily out of order. Therefore, when handling a product that includes a magnetic disk drive for a portable application, an attention had to be paid to avoid giving a strong impact to the product.

Japanese Patent Application Laid-Open No. 2002-8336 discloses a technology that uses a fall sensor to prevent damages caused by falls of the magnetic disk drive and retracts the head from the disk surface when a free fall of the magnetic disk drive is detected.

However, with the conventional technology, the performance of the magnetic disk drive may be degraded because of erroneous detections of the falls caused by sudden disturbances and periodic vibrations, which always leads to a retraction of the head from the disk surface.

SUMMARY OF THE INVENTION

It is an object of the present invention to at least partially solve the problems in the conventional technology.

A control apparatus according to one aspect of the present invention is for a storage device that detects retracts a head on a storage medium upon detecting a fall. The control apparatus includes a sample-information extracting unit that acquires a fall signal indicating whether the storage device is falling, conducts a sampling of the fall signal, and sequentially extracts sample information including either one of first information indicating a falling state and second information indicating a non-falling state; and a retraction determining unit that determines whether to retract the head, based on features of an array of the extracted sample information.

A storage device according to another aspect of the present invention detects retracts a head on a storage medium upon detecting a fall. The storage device includes a sample-information extracting unit that acquires a fall signal indicating whether the storage device is falling, conducts a sampling of the fall signal, and sequentially extracts sample information including either one of first information indicating a falling state and second information indicating a non-falling state; and a retraction determining unit that determines whether to retract the head, based on features of an array of the extracted sample information.

A head retracting method according to still another aspect of the present invention is for retracting a head from a storage medium by detecting a fall of a storage device. The head retracting method includes sample-information extracting including acquiring a fall signal indicating whether the storage device is falling, conducting a sampling of the fall signal, and extracting sequentially sample information including either one of first information indicating a falling state and second information indicating a non-falling state; and determining whether to retract the head, based on features of an array of the extracted sample information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 5:
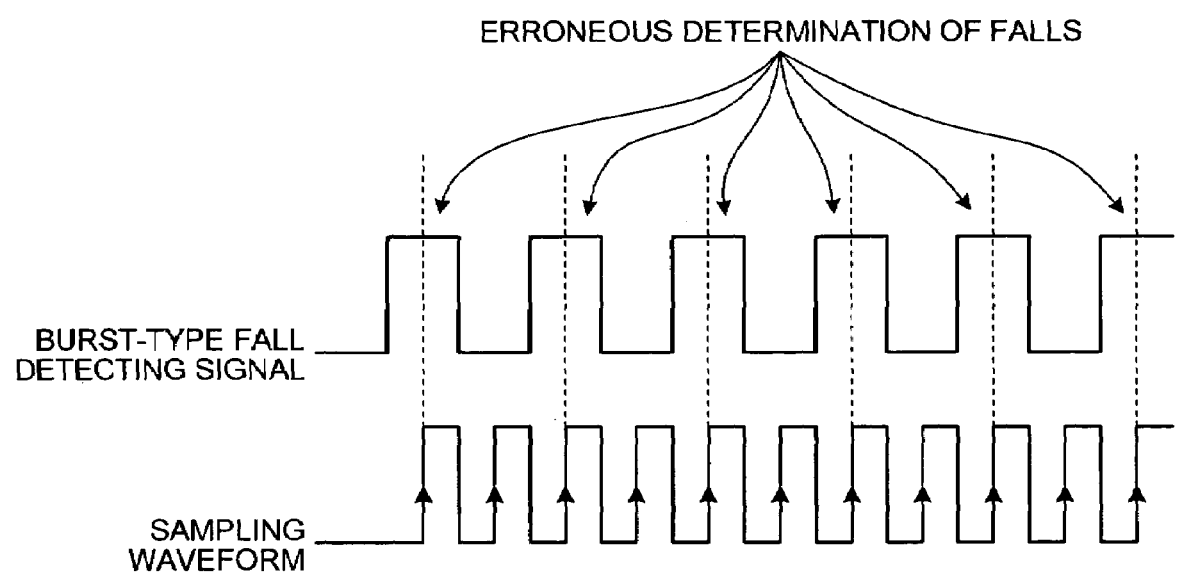
FIG. 5 is a schematic diagram for explaining a problem with a conventional technology.

Features of a magnetic disk drive 100 according to an embodiment of the present invention will be explained comparing to a conventional technology. FIG. 5 is a schematic diagram for explaining a problem with the conventional technology. When a device having a magnetic disk drive (such as a personal computer) is taken inside a train, etc., the device can supposedly receive constant periodic vibrations (or vibrations with 50% duty). In this circumstance, a burst-type fall signal is inputted from a fall sensor that detects falls of the magnetic disk drive. And the conventional technology had a problem of erroneously determining that the magnetic disk drive is falling and retracts a head even though the magnetic disk drive is non-falling, when the timing of the burst-type fall signal becoming "1 (high)" and the sample extraction timing of a sampling waveform (an rising edge of the sampling waveform) correspond.

Figure 1:
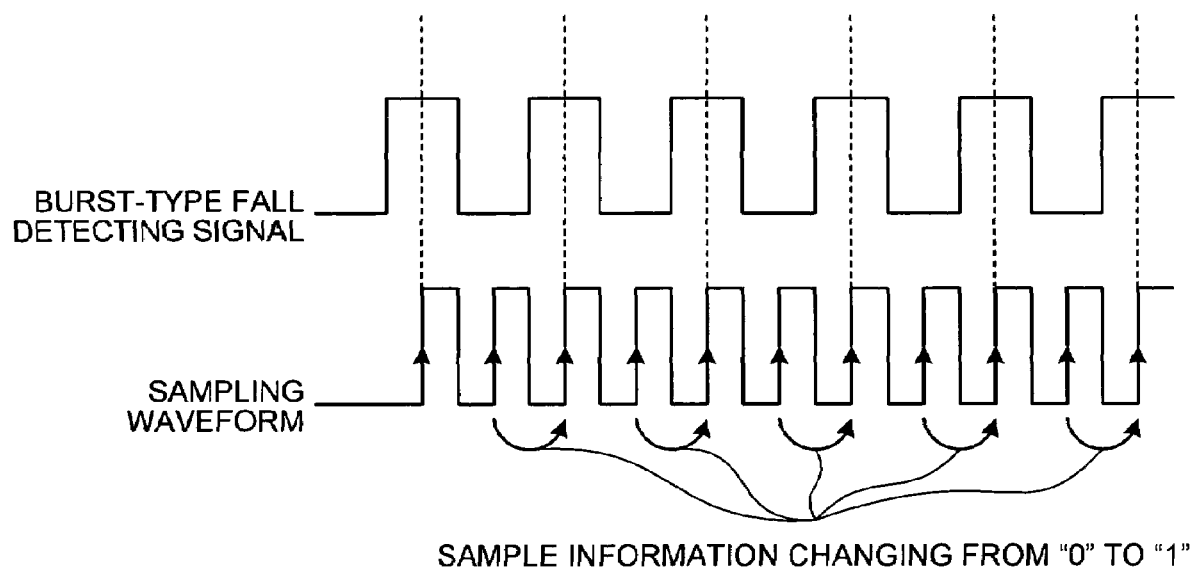
FIG. 1 is a schematic diagram for explaining features of a magnetic disk drive according to an embodiment of the present invention.

FIG. 1 is a schematic diagram for explaining features of the magnetic disk drive 100 according to the present embodiment. The magnetic disk drive 100 acquires a fall signal from the fall sensor, the fall signal indicating whether the magnetic disk drive 100 is falling, and the magnetic disk drive 100 executes sampling to the acquired fall signal. The magnetic disk drive 100 determines whether to retract the head based on the features of alignments of sample information acquired as a result of sampling execution. The sample information includes information of the magnetic disk drive 100 falling or information of the magnetic disk drive 100 non-falling. According to the present embodiment, sample information in the case of the magnetic disk drive 100 falling is "1 (high)" and sample information in the case of the magnetic disk drive 100 non-falling is "0 (low)".

Since the magnetic disk drive 100 determines whether to retract the head based on the features of the alignments of the sample information, erroneous detections of falls can be prevented and unnecessary head retractions can be prevented, even if the magnetic disk drive 100 acquires the burst-type fall signal from the fall sensor affected by the constant periodic vibrations.

Figure 2:
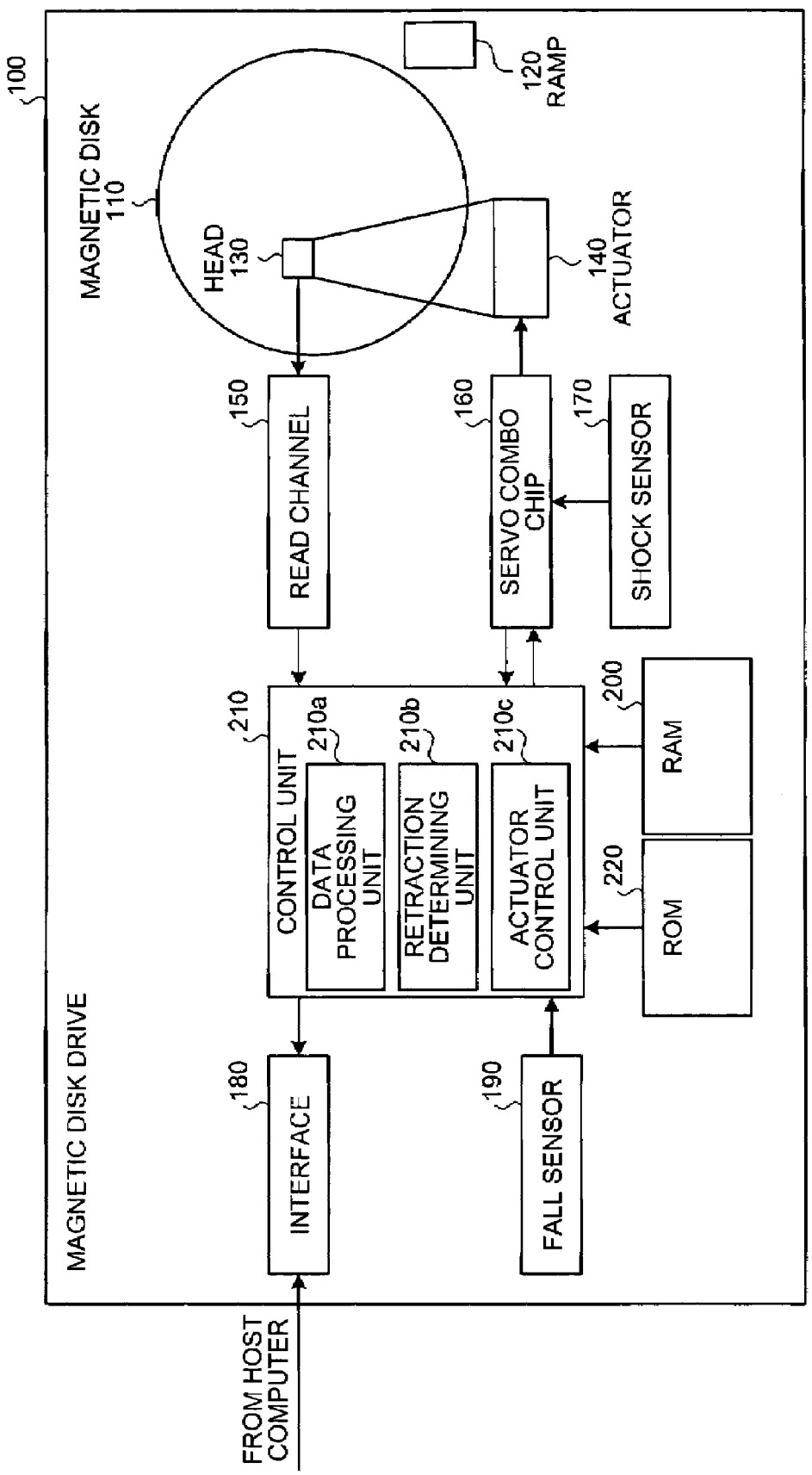
FIG. 2 is a functional block diagram of a configuration of the magnetic disk drive according to the present embodiment.

FIG. 2 is a functional block diagram of a configuration of the magnetic disk drive 100. As shown in FIG. 2, the magnetic disk drive 100 is configured to include a magnetic disk 110, a ramp 120, a head 130, an actuator 140, a read channel 150, a servo combo chip 160, a shock sensor 170, an interface 180, a fall sensor 190, a random access memory (RAM) 200, a control unit 210, and a read only memory (ROM) 220. Other configurations are similar to the configurations of a general magnetic disk drive with a Load/Unload method, and will not be explained.

The magnetic disk 110 is a recording medium forming a magnetic film on a metal or glass disk-shaped substrate. To record data on the magnetic disk 110, a magnetic field is radiated from the head 130 to a recording area that records data of the magnetic disk 110, and the magnetization state of the magnetic film of the magnetic disk 110 is changed. To reproduce the data from the magnetic disk 110, the head 130 is moved to a recording area on the magnetic disk 110 to be reproduced and the magnetization state of the magnetic film of the magnetic disk 110 is read.

The magnetic disk 110 is provided with a fixed cylinder (or unload cylinder). When the magnetic disk drive 100 retracts the head 130 to the ramp 120, the magnetic disk drive 100 first moves the head 130 to the fixed cylinder provided at the magnetic disk drive 100, and then retracts the head 130 to the ramp 120. The distance between the position of the fixed cylinder provided at the magnetic disk drive 100 and the position of the ramp 120 is maintained constant. The ramp 120 is a part that stops the head 130 during retractions.

The head 130 is a device that records and reproduces data to and from the magnetic disk 110. The head 130 reads a servo signal that controls a track position, etc, from the magnetic disk 110 and outputs to the read channel 150 the servo signal with reproduction data reproduced from the magnetic disk 110.

The actuator 140 is a device that includes a voice coil motor (VCM) and that moves the head 130 with a control current outputted from the servo combo chip 160. The read channel 150 is a device that acquires reproduction data and the servo signal from the head 130, and outputs the acquired reproduction data and servo signal to the control unit 210.

The servo combo chip 160 is a device that outputs the control current to the actuator 140 following instructions from the control unit 210 and that controls the movement of the head 130. The servo combo chip 160 also outputs the control current to a spindle motor not shown and that controls the rotation of the magnetic disk 110.

The shock sensor 170 is a sensor that detects shocks given to the magnetic disk drive 100. The shock sensor 170 outputs information of the detected shocks to the control unit 210 through the servo combo chip 160.

The interface 180 is a device that controls communication with a host computer not shown in the drawings. The fall sensor 190 is a sensor that detects free falls of the magnetic disk drive 100 in all three-axis (X, Y, Z) directions, and outputs a fall signal indicating whether the magnetic disk drive 100 is falling to the control unit 210.

The RAM 200 is a device that stores data necessary for various processes by the control unit 210. For example, the RAM 200 stores data to be recorded on the magnetic disk 110 acquired from the host computer, or data reproduced from the magnetic disk 110.

The control unit 210 is a device that executes various processes using programs and control data that provide various processes recorded in the ROM 222. Particularly, the control unit 210 deeply related to the present invention includes a data processing unit 210a, a retraction determining unit 210b, and an actuator control unit 210c.

Among these units, the data processing unit 210a is a control unit that records data acquired from the host computer to the RAM 200, acquires data (data reproduced from the magnetic disk 110, etc.) from the RAM 200 complying with a request from the host computer, and outputs the data to the host computer.

Figure 3:
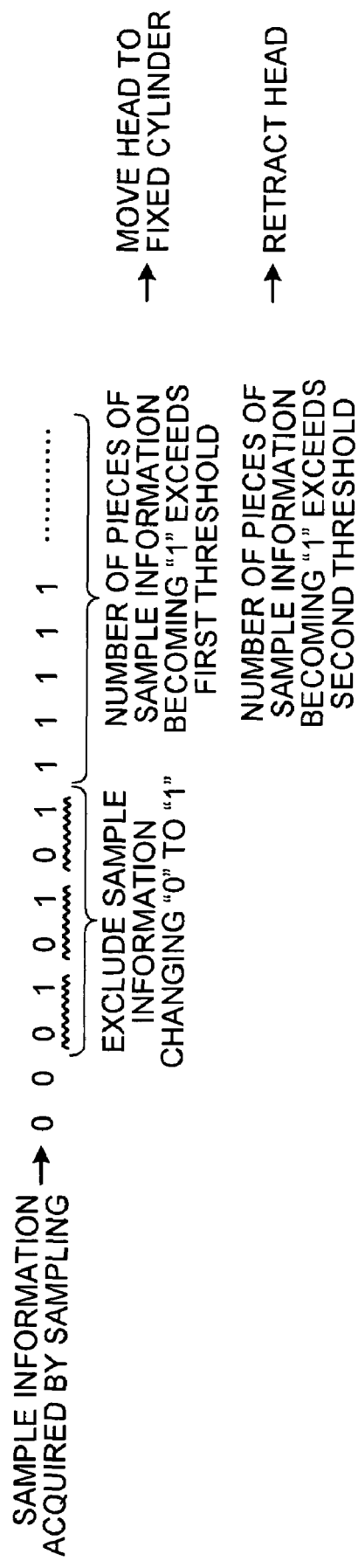
FIG. 3 is a schematic diagram for explaining a process performed by a retraction determining unit.

The retraction determining unit 210b is a control unit that conducts sampling to the fall signal inputted from the fall sensor 190, and determines whether to retract the head 130 based on the features of the alignments of the sample information acquired by sampling. FIG. 3 is an explanatory view that explains a process of the retraction determining unit 210b.

As shown in FIG. 3, from the remaining information excluding sample information that changes from "0 (low)" to "1 (high)", the retraction determining unit 210b counts the number of sample information that includes "1 (high)", and determines to move the head 130 to the fixed cylinder when the counted number (hereinafter, "count value") exceeds the first threshold.

From the remaining information excluding sample information that changes from "0 (low)" to "1 (high)", the retraction determining unit 210b counts the number of sample information that includes "1 (high)", and determines to retract the head 130 when the counted number (i.e. count value) exceeds the second threshold.

The retraction determining unit 210b changes the timing of the sampling to the fall signal based on the sample information acquired as a result of the sampling to the fall signal. For example, the retraction determining unit 210b changes the timing of the sampling when the sample information includes "1 (high)" for predetermined times successively, since the timing of becoming "1 (high)" of the burst-type fall signal resulting from the constant periodic vibrations and the timing of the sampling are considered to correspond.

The actuator control unit 210c is a device that outputs a control command to the servo combo chip 160 according to the determination result of the retraction determining unit 210b, and moves the head to the predetermined position. Specifically, the actuator control unit 210c moves the head 130 to the fixed cylinder when the retraction determining unit 210b determines that the count value exceeds the first threshold, and retracts the head 130 to the ramp 120 when the retraction determining unit 210b determines that the count value exceeds the second threshold.

The actuator control unit 210c moves the head 130 to predetermined areas (areas that may be recorded or reproduced) of the magnetic disk 110 when the actuator control unit 210c records or reproduces data to the magnetic disk 110.

Figure 4:
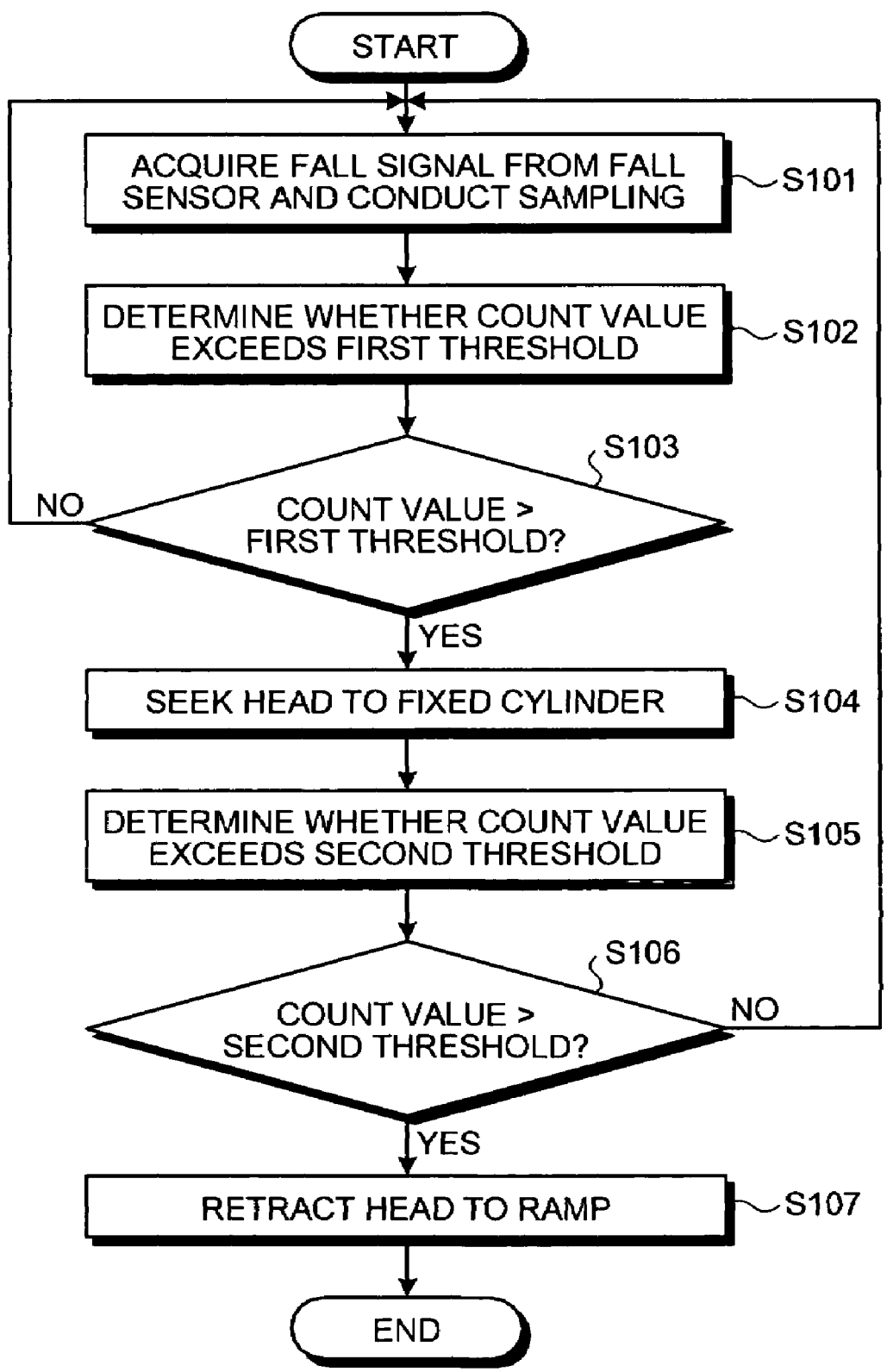
FIG. 4 is a flowchart of a processing procedure of the magnetic disk drive according to the present embodiment.

A process of the magnetic disk drive 100 according to the present embodiment will be explained. FIG. 4 is a flowchart of a processing procedure of the magnetic disk drive 100 according to the present embodiment. As shown in FIG. 4, the retraction determining unit 210b acquires the fall signal from the fall sensor 190 and conducts sampling (step S101), and determines whether the count value exceeds the first threshold (step S102).

When the count value does not exceed the first threshold (step S103, No), the process is moved to step S101, and when the count value exceeds the first threshold (step S103, Yes), the actuator control unit 210c seeks the head 130 to the fixed cylinder (step S104).

The retraction determining unit 210b determines whether the count value exceeds the second threshold (step S105), and when the count value does not exceed the second threshold (step S106, No), the process is moved to step S101.

When the count value exceeds the second threshold (step S106, Yes), the actuator control unit 210c retracts the head to the ramp 120 (step S107).

Unnecessary retractions can be eliminated and performance of the magnetic disk drive can be improved since the retraction determining unit 210b counts the count value based on the features of the sample information and retracts the head 130 to the ramp 120.

As described above, in the magnetic disk drive 100 according to the present embodiment, the retraction determining unit 210b conducts sampling by acquiring the fall signal from the fall sensor 190 and extracts the sample information. From the remaining sample information excluding the sample information that changes from "0 (low)" to "1 (high)", the retraction determining unit 210b counts the number of sample information that includes "1 (high)", and when the count value exceeds the predetermined number, the retraction determining unit 210b determines to retract the head to the ramp and the actuator control unit 210c retracts the head 130 to the ramp 120. Therefore, erroneous determinations of head retraction resulting from the constant periodic vibrations can be prevented and the head can be retracted appropriately.

Although the retraction determining unit 210b described above counts the number of the sample information that includes "1 (high)" excluding the sample information that changes from "0 (low)" to "1 (high)", it is not limited to this. Other examples of the processes of the retraction determining unit 210b will be explained below.

The retraction determining unit 210b may count the number of the sample information that includes "1 (high)" from the remaining sample information excluding the sample information that changes from "1 (high)" to "0 (low)". The retraction determining unit 210b may also count the number of the sample information that includes "1 (high)" from the remaining sample information excluding the sample information that changes in the order of "0 (low)", "1 (high)", "0 (low)", or in the order of "1 (high)", "0 (low)", "1 (high)".

Although the retraction determining unit 210b determines whether the head is retracted based on the count value, it is not limited to this. For example, focusing on the extraction period of the sample information that includes "1 (high)" of the remaining sample information excluding the sample information that changes from "0 (low)" to "1 (high)", the retraction determining unit 210b may determine to retract the head 130 to the ramp 120 when the extraction period of the sample information exceeds the predetermined period (the same applies in the case the sample information changing from "1 (high)" to "0 (low)" is excluded and in the cases the sample information changing in the order of "0 (low)", "1 (high)", "0 (low)", or in the order of "1 (high)", "0 (low)", "1 (high)" are excluded).

The various processes explained in the embodiments can be realized by executing prepared programs with a magnetic disk drive (computer). In the example of FIG. 2, various programs that realize the various processes are stored in the ROM 220, and the various processes that realize functions of the various processing units (the data processing unit 210a, the retraction determining unit 210b, and the actuator control unit 210c) are activated with the control unit 210 reading and executing the various programs recorded in the ROM 220.

The various programs are not necessarily to be stored in the ROM from the beginning. For example, the various programs can be stored in "portable physical media" such as a flexible disk (FD), a CD-ROM, a DVD disk, a magneto-optical disk, and an IC card that are inserted to computers, or in "fixed physical media" such as a hard disk drive (HDD) provided inside and outside of computers, or in "other computers (or servers)" that are connected to computers through public lines, Internet, LAN, WAN, etc., and the computers can read the various programs from the media and execute the various programs.

Although the embodiments of the present invention are explained thus far, other than the above embodiments, the present invention can be implemented in different embodiments within the technical scope of the claims.

All or some of the processes in the embodiments that are explained to be executed automatically can be executed manually, or all or some of the processes that are explained to be executed manually can be executed automatically with known methods.

The information including processing procedures, controlling procedures, specific names, and various data and parameters in the above document and drawings can arbitrarily be modified if not otherwise specified.

The components of the devices in the drawings are functional and conceptual, and the components are not necessarily to be physically configured as in the drawings. Specific configurations of distribution and integration of the devices are not limited to the configurations in the drawings, and all or some of the configurations can be configured by functionally or physically distributing and integrating in arbitrary units, in compliance with various loads and usage statuses.

All or arbitrary parts of processing functions conducted by the devices can be realized by a CPU and programs analyzed and executed by the CPU, or can be realized as a hardware with a wired logic.

As described above, according to an embodiment of the present invention, unnecessary head retractions can be eliminated and the performance can be improved, since the fall signal indicating whether the magnetic disk drive is falling is acquired and sampling is conducted to the fall signal, sample information including the first information indicating the falling state of the magnetic disk drive or the second information indicating the non-falling state of the magnetic disk drive are extracted in order, and whether the head is to be retracted is determined based on the features of alignments of the extracted sample information.

Furthermore, according to an embodiment of the present invention, erroneous detections of falls can be prevented and more appropriate head retractions can be conducted, since the head is determined to be retracted when the number of the sample information that includes the first information becomes greater than the threshold value, the sample information excluding the sample information that changes from the second information to the first information.

Moreover, according to an embodiment of the present invention, erroneous detections of falls can be prevented and more appropriate head retractions can be conducted, since the head is determined to be retracted when the extraction period of the sample information that includes the first information becomes greater than the threshold value, the sample information excluding the sample information that changes from the second information to the first information.

Furthermore, according to an embodiment of the present invention, erroneous detections of falls can be prevented and more appropriate head retractions can be conducted, since the head is determined to be retracted when the number of the sample information that includes the first information becomes greater than the threshold value, the sample information excluding the sample information that changes from the first information to the second information.

Moreover, according to an embodiment of the present invention, erroneous detections of falls can be prevented and more appropriate head retractions can be conducted, since the head is determined to be retracted when the extraction period of the sample information that includes the first information becomes greater than the threshold value, the sample information excluding the sample information that changes from the first information to the second information.

Furthermore, according to an embodiment of the present invention, erroneous detections of falls can be prevented and more appropriate head retractions can be conducted, since the head is determined to be retracted when the number of the sample information that includes the first information becomes greater than the threshold value, the sample information excluding the sample information that changes in the order of the first information, the second information, and the first information.

Moreover, according to an embodiment of the present invention, erroneous detections of falls can be prevented and more appropriate head retractions can be conducted, since the head is determined to be retracted when the extraction period of the sample information that includes the first information becomes greater than the threshold value, the sample information excluding the sample information that changes in the order of the first information, the second information, and the first information.

Furthermore, according to an embodiment of the present invention, erroneous detections of falls due to constant periodic vibrations can be prevented since the timing of sampling to the fall signal is changed when the sampling information includes the first information predetermined times successively.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus for a storage device that retracts a head on a storage medium upon detecting a fall, the control apparatus comprising:
    a sample-information extracting unit that acquires a fall signal indicating whether the storage device is falling, conducts a sampling of the fall signal, and sequentially extracts sample information including either one of first information indicating a falling state and second information indicating a non-falling state; and
    a retraction determining unit that determines whether to retract the head, based on features of an array of the extracted sample information.

2. The control apparatus according to claim 1, wherein
the retraction determining unit determines to retract the head when number of pieces of the sample information including the first information is greater than a predetermined threshold, excluding sample information that changes from the second information to the first information.

3. The control apparatus according to claim 1, wherein
the retraction determining unit determines to retract the head when an extraction period of the sample information including the first information is greater than a predetermined threshold, excluding sample information that changes from the second information to the first information.

4. The control apparatus according to claim 1, wherein
the retraction determining unit determines to retract the head when number of pieces of the sample information including the first information is greater than a predetermined threshold, excluding sample information that changes from the first information to the second information.

5. The control apparatus according to claim 1, wherein
the retraction determining unit determines to retract the head when an extraction period of the sample information including the first information is greater than a predetermined threshold, excluding sample information that changes from the first information to the second information.

6. The control apparatus according to claim 1, wherein
the retraction determining unit determines to retract the head when number of pieces of the sample information including the first information is greater than a predetermined threshold, excluding sample information that changes in order of the first information, the second information, and the first information.

7. The control apparatus according to claim 1, wherein
the retraction determining unit determines to retract the head when an extraction period of the sample information including the first information is greater than a predetermined threshold, excluding sample information that changes in order of the first information, the second information, and the first information.

8. The control apparatus according to claim 1, further comprising
a changing unit that changes a timing of sampling of the fall signal when the extracted sampling information includes the first information for a predetermined number of times successively.

9. A storage device that retracts a head on a storage medium upon detecting a fall, the storage device comprising:
    a sample-information extracting unit that acquires a fall signal indicating whether the storage device is falling, conducts a sampling of the fall signal, and sequentially extracts sample information including either one of first information indicating a falling state and second information indicating a non-falling state; and
    a retraction determining unit that determines whether to retract the head, based on features of an array of the extracted sample information.

10. The storage device according to claim 9, wherein the retraction determining unit determines to retract the head when number of pieces of the sample information including the first information is greater than a predetermined threshold, excluding sample information that changes from the second information to the first information.

11. The storage device according to claim 9, wherein the retraction determining unit determines to retract the head when an extraction period of the sample information including the first information is greater than a predetermined threshold, excluding sample information that changes from the second information to the first information.

12. The storage device according to claim 9, wherein the retraction determining unit determines to retract the head when number of pieces of the sample information including the first information is greater than a predetermined threshold, excluding sample information that changes from the first information to the second information.

13. The storage device according to claim 9, wherein the retraction determining unit determines to retract the head when an extraction period of the sample information including the first information is greater than a predetermined threshold, excluding sample information that changes from the first information to the second information.

14. The storage device according to claim 9, wherein the retraction determining unit determines to retract the head when number of pieces of the sample information including the first information is greater than a predetermined threshold, excluding sample information that changes in order of the first information, the second information, and the first information.

15. The storage device according to claim 9, wherein the retraction determining unit determines to retract the head when an extraction period of the sample information including the first information is greater than a predetermined threshold, excluding sample information that changes in order of the first information, the second information, and the first information.

16. The storage device according to claim 9, further comprising
a changing unit that changes a timing of sampling of the fall signal when the extracted sampling information includes the first information for a predetermined number of times successively.

17. A head retracting method of retracting a head from a storage medium by detecting a fall of a storage device, the head retracting method comprising:
sample-information extracting including
acquiring a fall signal indicating whether the storage device is falling;
conducting a sampling of the fall signal; and
extracting sequentially sample information including either one of first information indicating a falling state and second information indicating a non-falling state; and
determining whether to retract the head, based on features of an array of the extracted sample information.

18. The head retracting method according to claim 17, wherein
the determining includes determining to retract the head when number of pieces of the sample information including the first information is greater than a predetermined threshold, excluding sample information that changes from the second information to the first information.

19. The head retracting method according to claim 17, wherein
the determining includes determining to retract the head when an extraction period of the sample information including the first information is greater than a predetermined threshold, excluding sample information that changes from the second information to the first information.

20. The head retracting method according to claim 17, further comprising
changing a timing of sampling of the fall signal when the extracted sampling information includes the first information for a predetermined number of times successively.

* * * * *